US007376955B1

(12) United States Patent
Forman

(10) Patent No.: US 7,376,955 B1
(45) Date of Patent: May 20, 2008

(54) SERVER COMMUNICATION CHANNEL ARCHITECTURE AND IMPLEMENTATION METHOD

(75) Inventor: Lane Scott Forman, Santa Cruz, CA (US)

(73) Assignee: Trend Micro, Inc. (JP)

( * ) Notice: Subject to any disclaimer, the term of this patent is extended or adjusted under 35 U.S.C. 154(b) by 1019 days.

(21) Appl. No.: 10/600,778

(22) Filed: Jun. 20, 2003

(51) Int. Cl.
*G06F 9/00* (2006.01)
(52) U.S. Cl. .................. 719/310; 719/328; 709/201; 709/203; 718/106; 718/107
(58) Field of Classification Search ............... 719/328, 719/310; 709/201, 203; 718/106, 107
See application file for complete search history.

(56) References Cited

U.S. PATENT DOCUMENTS 6,938,211 B1 * 8/2005 Chang et al. ............... 715/733
7,017,162 B2 * 3/2006 Smith et al. ................ 719/328
7,117,246 B2 * 10/2006 Christenson et al. ....... 709/206
7,117,504 B2 * 10/2006 Smith et al. ................ 719/328

* cited by examiner

*Primary Examiner*—William Thomson
*Assistant Examiner*—Phuong N Hoang
(74) *Attorney, Agent, or Firm*—Beyer Law Group LLP

(57) ABSTRACT

A Sever Communication Channel ("SCC") architecture is described. The SCC architecture provides an abstract base class that describes specific service interfaces called for each service and allows handling of specific protocols for servicing the clients. Worker threads that provide services through different protocols call the specific service interfaces. One application program thereby can implement different protocols for providing diverse types of services such as, for example, scanning services.

10 Claims, 4 Drawing Sheets

SERVER COMMUNICATION CHANNEL ARCHITECTURE AND IMPLEMENTATION METHOD

TECHNICAL BACKGROUND

1. Field of the Invention

The present application relates to a server communication channel architecture and implementation method, and more particularly, to a multi-process, multi-threaded server communication channel architecture and implementation method.

2. Description of the Related Art

Client/server system architectures are well known in the field of network communication. Typically, in a client/server communication model, a client sends a service request to a server. The server processes the service request and responds with the result. Typically, a client computing system is coupled to a server computing system via one or more communication ports. An application program interface ("socket") facilitates the communication between the client and the server processes at the communication port. The sockets generally execute on server computing systems and are associated with specific ports.

Several different client/server communication models are currently known for managing multiple client requests. According to one known model, the server typically creates a separate child process for each client. In this case, a child process typically inherits the socket descriptor representing the socket associated with the port at which a given client's request is received. According to another known model, the server typically creates a separate thread or task for each client. In that case, all the threads in the server process usually share the same socket descriptor.

Accordingly, an object-oriented server communication channel architecture and implementation method is needed for enabling an execution thread in a server to process a client requests from different protocols on different sockets corresponding to the client request.

SUMMARY

In some embodiment, a SCC architecture is described. In some variations, the SCC architecture executes as a multi-process, multi-threaded service. In some embodiment, the SCC architecture creates a parent process that executes on a server. In some variations, the parent process creates a process pool of child processes. In other variations, each child process in the process pool creates its own pool of execution threads. In some embodiment, the parent process monitors the child processes in the pool. In some variations, the parent process is configured to restart child processes that unexpectedly terminate and increase or decrease the size of the process pool according to the service load of the server.

In some embodiment, a method of servicing a client request in a server is described. In some variations, the method includes determining a first service interface subclass corresponding to the client request from one or more service interface subclasses derived from a request interface base abstract class, and servicing the client request using the first service interface subclass, wherein the first service interface subclass corresponds to at least one service provided by the server at a corresponding port. In some embodiment, the service interface subclasses include at least one protocol handler for servicing the client request at the corresponding port. In some variations, the first service interface subclass is determined from a configuration file. In some embodiment, the configuration file includes descriptions of the one or more services provided by the server, and corresponding ports for the services. In some variations, a parent process performs the determining and servicing.

In some embodiment, the method includes creating one or more child processes, wherein the child processes are configured to service client requests. In some variations, the method includes creating one or more execution threads for each child process. In some embodiment, the method includes selecting a socket requested by the client request, blocking the selected socket, and upon servicing the client request, unblocking the selected socket. In some variations, the method includes adjusting a number of child processes according to a load of the server.

In some embodiment, A SCC architecture for servicing at least one client request on one or more socket ports on a server is described. In some variations, the SCC architecture includes an abstract base class describing one or more service interfaces, wherein each service interface is configured to service at least one client connection corresponding to the at least one client request on the socket ports; and a process pool of one or more child processes, wherein each child process is configured to create a pool of one or more execution threads configured to call the service interfaces of the abstract base class for servicing the client request. In some variations, the SCC architecture includes one or more subclasses derived from the abstract base class and corresponding to the service interfaces, wherein the subclasses represent at least one service provided by the server at a particular socket port. In some embodiment, the SCC architecture includes at least one parent process configured to create at least one socket for the at least one client connection; create the service interfaces of the abstract base class, create the process pool of child processes, and monitor the child processes.

In some embodiment, the SCC architecture includes at least one configuration file, wherein the configuration file describes one or more services provided by the server and one or more ports corresponding to the services. In some variations, the parent process is further configured to use the configuration file to create the service interfaces of the abstract base class. In some embodiment, the child processes are configured to determine a number of client requests that can be serviced by each child process, and determine a number of execution threads to be created by each child process. In some variations, the execution threads are configured for serial access to the socket ports. In some embodiment, a pointer is used to indicate a particular service interface corresponding to a particular socket port of the client connection. In some variations, each execution thread is configured to prior to calling the service interfaces, determine one of the socket ports corresponding to the at least one client request; and determine one of the service interfaces corresponding to the client request.

The foregoing is a summary and shall not be used to limit the scope of the claims. The operations disclosed herein may be implemented in a number of ways, and such changes and modifications may be made without departing from this invention and its broader aspects. Other aspects, inventive features, and advantages of the present invention, as defined solely by the claims, are described in the non-limiting detailed description set forth below.

DESCRIPTION OF THE PREFERRED EMBODIMENT(S)

In the present application, a SCC architecture is described. The SCC architecture executes as a multi-process, multi-threaded service. The SCC architecture creates a parent process that executes on a server. The parent process creates a process pool of child processes. Each child process in the process pool creates its own pool of execution threads. A single-process, single-thread SCC configuration includes a parent process creating a process pool with one child process and the child process creating a thread pool with one execution thread. The parent process monitors the child processes in the pool. The parent process is configured to restart child processes that unexpectedly terminate and increase or decrease the size of the process pool according to the service load of the server.

A configuration file defines various parameters for a particular SSC implementation such as, for example, the characteristics of the parent process, an initial size of the child process pool, a size of the execution thread pool for each child process, a service load indicator to determine when to adjust the size of the child process pool, and the like. The configuration file further defines the services provided by the server and corresponding ports that are used to provide those services. The SCC architecture further includes an abstract base class that describes the service interfaces that are specifically called for by each service request from the clients. The abstract base class is a template defining a number of subclasses. The abstract base class can also define the code for each subclass. One or more service interface subclasses are derived from the abstract base class. The service interface subclasses represent the services provided by the server on corresponding sockets. When a client connects to a socket, then a service interface subclass defined for that socket services the client connection.

Figure 1A:
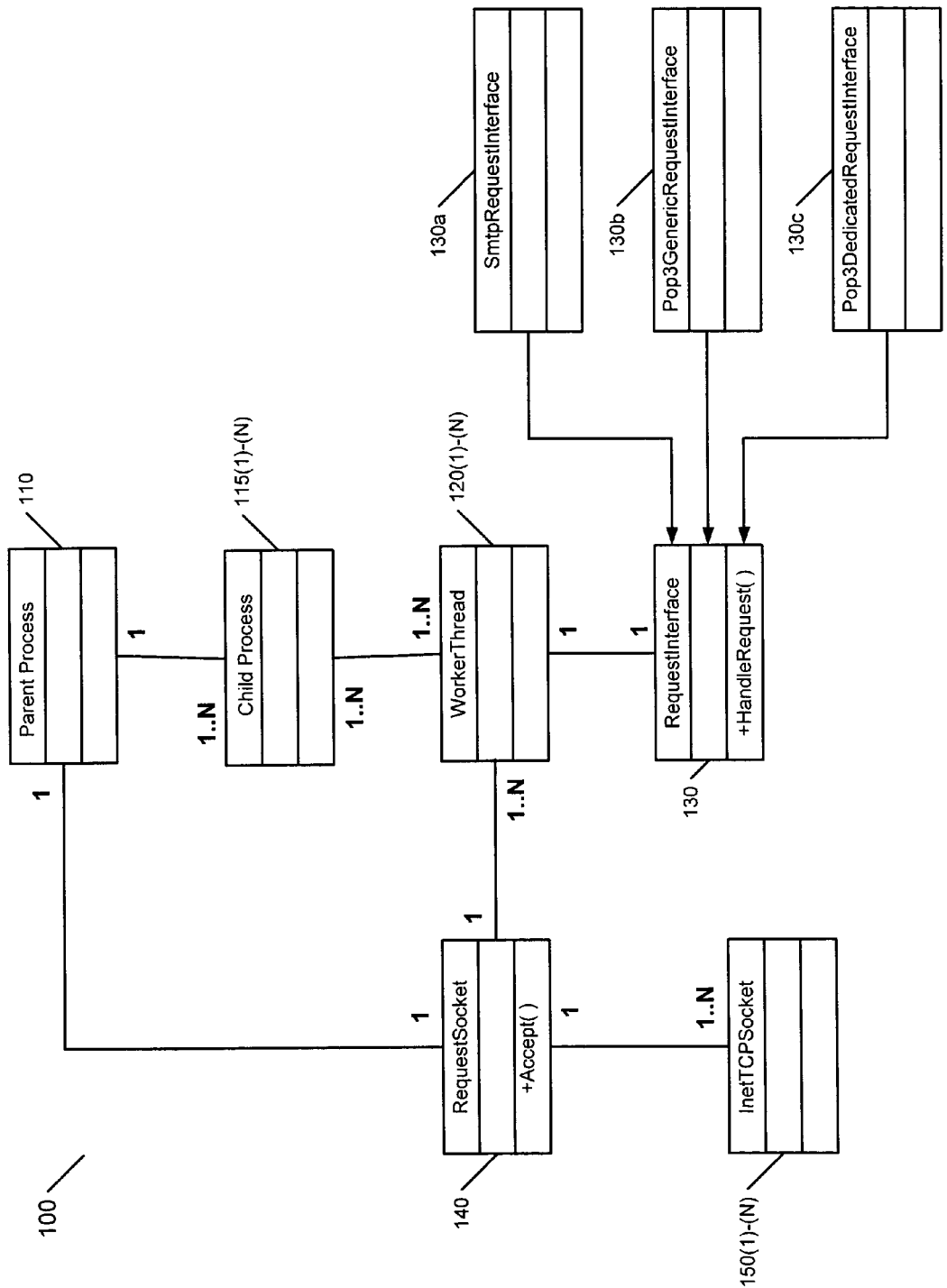
FIG. 1A is an object diagram illustrating a server communication channel ("SCC") architecture according to an embodiment of the present invention.

FIG. 1A is an object diagram illustrating a SCC architecture 100 according to an embodiment of the present invention. The object implementation of the SCC architecture 200 includes a parent process 110, 'N' child processes 115(1)-(N), 'N' worker threads 120(1)-(N), a request interface 130, a request socket 140, and 'N' Internet sockets 150(1)-(N). For purposes of illustration, in the present example, the Internet socket 150 is shown and described as a designated Internet type socket for establishing connection between a client and a server. However, one skilled in the art will appreciate that the Internet socket 150 can be any socket required for a particular server application.

The request interface 130 is an abstract base class. Multiple subclasses can be derived from a given abstract base class. The abstract base class request interface 130 describes the service interfaces that can be called for each service request from clients. A tag in the abstract base class determines a corresponding derived subclass. The derived subclass represents a particular service provided by the server. The derived subclasses embody specific protocol handlers that provide adequate interface for handling the client connections at specific ports. In the present example, SmtpRequestInterface 130a, Pop3GenericRequestInterface 130b, and Pop3DedicatedRequestInterface 130c are subclasses that are derived from the abstract base class requester interface 130. While for purposes of illustration, three subclasses are derived from the abstract class request interface 130, one skilled in the art will appreciate that any number of subclasses can be derived from a given abstract base class.

The request socket 140 includes an Accept( ) function. The request interface 130 defines a handle request method using a HandleRequest( ) function. The Accept( ) and HandleRequest( ) functions are generally known in the art. A configuration file describes the services provided by the server and corresponding ports for these services. Initially, the parent process 110 reads the configuration file to determine the services provided by the server and corresponding ports associated with each service. The parent process 110 then creates a socket for each service. The request interface 130 defines subclasses for each socket. The parent process 110 then associates the sockets with corresponding subclasses derived from the request interface 130. The parent process 110 then binds the sockets to the specified ports.

In the present example, subclass SmtpRequestInterface 130a handles Simple Mail Transfer Protocol ("SMTP") requests. SMTP is a known protocol used for sending emails between network elements. Subclass Pop3GenericRequestInterface 130b handles Post Office Protocol ("POP") requests. POP is a known protocol used for retrieving emails from a mail server. In the present example, subclass Pop3GenericRequestInterface 130b is configured to retrieve emails using POP3 version of the protocol. The POP3 server for emails is identified in the request such as, for example, via standard "USER" command or the like. The subclass PoP3DedicatedRequestInterface 130c handles POP3 requests for a POP3 server whose identity is determined from the socket port of the client connection. While for purposes of illustration, SMTP and POP3 request interfaces are shown in the present example, one skilled in the art will appreciate that the subclasses can be defined for any protocol such as, for example, Internet Message Access Protocol ("IMAP") and the like. Once the sockets are created, the parent process 110 creates the child processes 115 as defined by the configuration file. The number of child processes 115 created by the parent process 110 depend on the load configuration of the server. Each child process 115 then executes a number of executable worker threads to service client requests.

Figure 1B:
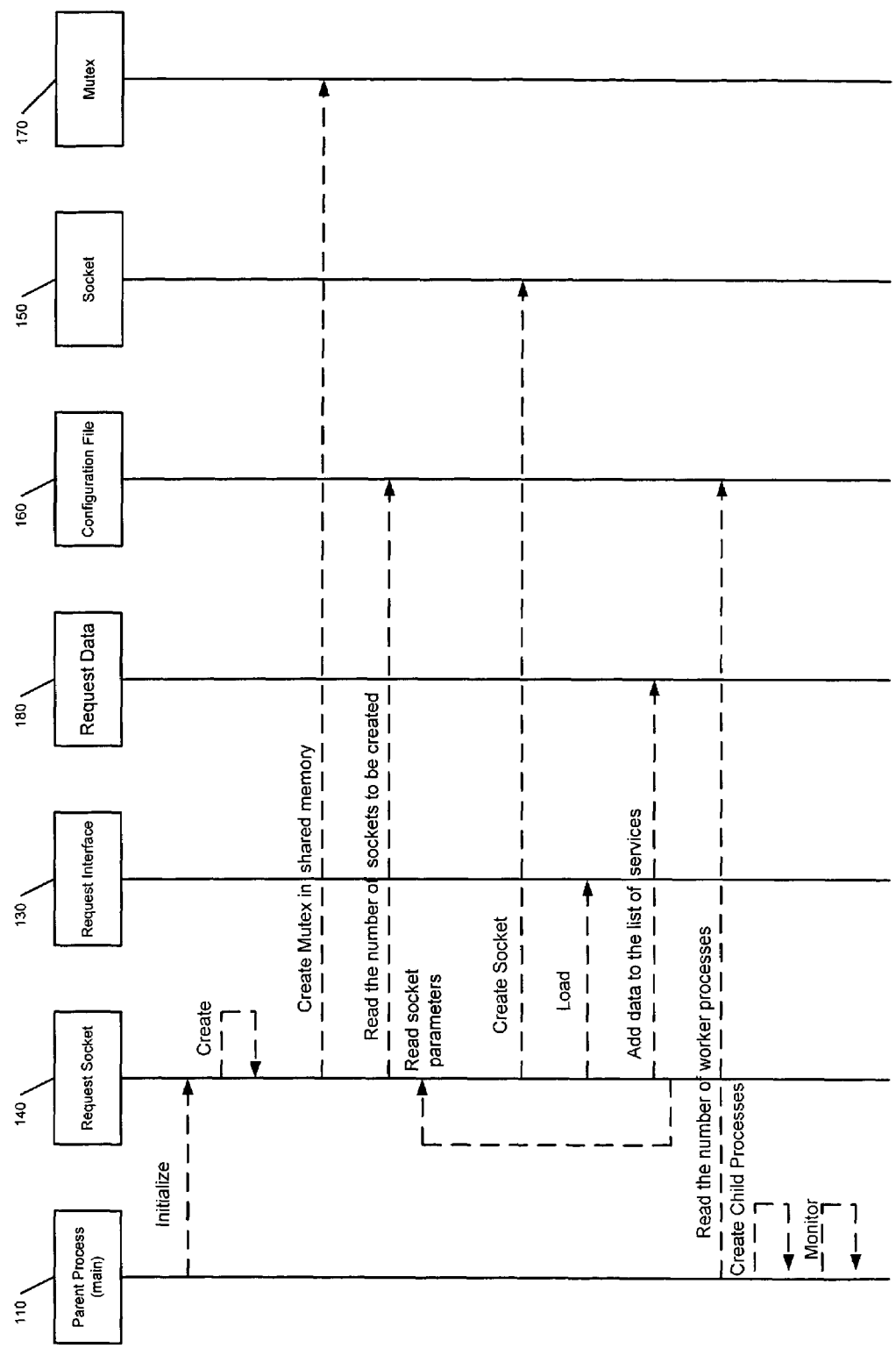
FIG. 1B is a sequence diagram of a parent process for a SCC architecture in a server according to an embodiment of the present invention.

FIG. 1B is a sequence diagram of the parent process 110 for a SCC in a server according to an embodiment of the present invention. The parent process 110 (main) begins with initialization. The process can be initialized using any initialization function such as, for example, via InitInstance function call or the like. Subsequently, the request socket 140 creates a Mutex 170 in a shared memory of the server. The Mutex 170 is a mutual exclusion lock that locks a resource (or object) so that only one process (or thread) can access the locked resource (or object). In the present example, the Mutex 170 is used to serialize the access to each server socket. The request socket 140 then reads the configuration file 160 to determine the number of sockets to be created.

The configuration file 160 includes description of parameters for each socket such as, for example, a port number, a type of service to be created for the port, request specific data and the like. The port number can include known socket port numbers in the art such as, for example, the port number 25 for SMTP protocol, the port number 110 for POP3 protocol and the like. The request socket 140 reads the parameter description for each socket from the configuration file 160 and creates corresponding sockets. The sockets can be created using a socket system call. The socket system call returns a socket descriptor for the newly created socket. The request socket 140 loads the socket and its corresponding description in the request interface 130. The request socket 140 adds the socket, the request interface class 130 and corresponding data to a list of services in a request data 180. The process is repeated until the required numbers of sockets are created. When all the sockets have been created, the parent process 110 determines the number of child processes 115 to be created. Typically, a fork system call is invoked to create the required number of child processes. The parent process 110 then monitors the child processes and the system load.

Each child process typically shares all the resources of its parent process such as, for example, file descriptors (particularly, socket descriptors), signal-handling status, memory layout and the like. The child process can terminate the processing by executing an exit system call. When a child process exits, the child process sends its exit status to its parent process. Typically, the exit status is one byte (or word) long. The child process can communicate with the parent process using various means such as, for example, by setting up an inter-process communication channel using pipes or sockets (e.g., the local domain sockets), by using an intermediate file and the like. When a child process terminates abnormally then a signal (error message) is sent to the parent process. Upon receiving the signal (error message) for abnormal termination, the parent process can retrieve appropriate information about the events that cause the abnormal termination of the child process. For example, in a 4.4BSD operating system, by executing a wait4 system call, the parent process can retrieve information about the event that caused termination of the child process and the resources consumed by the child process during its lifetime. Various other means are known in the art for monitoring the system load such as, for example, system batching and the like.

The child processes initially begins with root privileges, however, upon initialization, the child processes change their respective user identification to a non-root user account to minimize the security risks. According to an embodiment of the present invention, the child processes initially reads the configuration file to determine whether a limit is set on the number of requests that the child processes can service. If the configuration file describes such a limit, then each child process exits after the specified number of requests have been serviced. To provide services, each child process creates a pool of one or more worker threads 120. The size of the thread pool is determined from the configuration file. Each worker thread enters into a single thread execution loop. In the loop, each worker thread enters into a cross-process section that allows only one thread in any process to call the socket select function. This allows a serial execution of each thread. The worker thread calls a socket select function to select the requested socket. The selected socket is then blocked until the worker thread services the client request. The socket select function call returns with the description of the socket port that receives the client request. The worker thread then retrieves the correct subclass of the request interface class 130 for the socket and accepts the socket call. Next, the worker thread calls the handle request function of the request interface 130 to handle the client request.

Figure 1C:
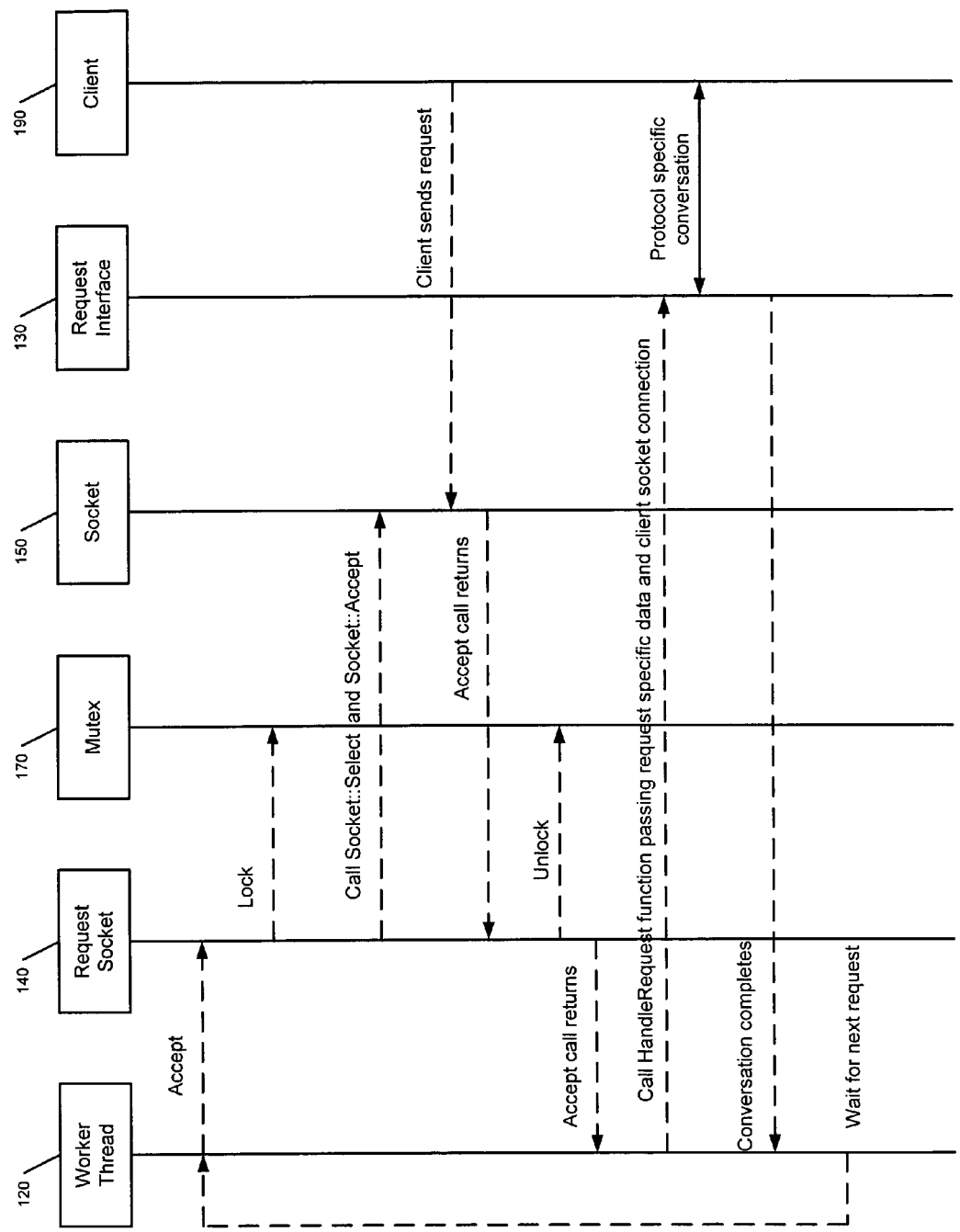
FIG. 1C is a sequence diagram of an infinite loop executed by a worker thread according to an embodiment of the present invention.

FIG. 1C is a sequence diagram of an infinite loop executed by a worker thread according to an embodiment of the present invention. A worker thread 120 calls the accept function of the request socket 140 to obtain a client connection. The request socket 140 then locks a Mutex 170 to assure that only one worker thread calls a socket select function at any given time for a given socket. Mutex 170 is a mutual exclusion lock. Mutex 170 is a program object that locks an object (or resource) so that only one thread can access the object at any time. This allows multiple threads to serially share the same object. Typically, Mutex are created with a unique identification at the initialization of a program. When a particular thread needs an object (or resource), the thread must lock the corresponding Mutex to exclude other threads from using the object (or resource). The Mutex are configured to unlock the corresponding object (or resource) when the object (or resources) is no longer needed by the thread or when the thread execution is completed.

After locking the Mutex 170, the request socket 140 calls a socket select function and an accept function respectively. The socket select function determines whether a client connection is present on the socket. The accept function extracts the first connection on the queue of connection on the socket. If a client connection is not present on the socket, the accept function waits for the client connection on any of the socket ports. The socket can be any defined socket such as, for example, an Internet socket (InetTepSocket) and the like. When a client 190 sends a request for connection, the socket select call function returns with the identification of the socket on which the client connection is made. After the connection is made, the accept call function returns, accepting the client connection on the selected socket. The request socket 140 then unlocks the Mutex 170.

The request socket 140 determines the class of the request interface 130 corresponding to the port on which the client is connected along with any request specific data for that port. The class of the request interface 130 can be determined using various means such as, for example, a pointer indicating the class of the request interface 130 or the like. The request specific data can include device information such as, the IP address, the domain name of a server (e.g., POP3 server), and the like. When the accept function call returns, the worker thread 120 determines the class of the request interface 130, the request specific data, and the identification of the socket where the client is connected.

The worker thread 120 then calls the HandleRequest function on the request interface 130. The worker thread 120 passes the request specific data and the client socket connection information to the HandleRequest function. The Client 190 and Request interface 130 exchange protocol specific data to establish communication parameters that enable the worker thread 120 to provide services to the client 190. The services provided by the worker thread 220 may include scanning services and the like. When the conversation is complete, the request interface 130 informs the worker thread 120 of this completion. The worker thread 120 then waits for a next request by calling the accept function on the request socket 140 to obtain a new client connection.

Figure 2:
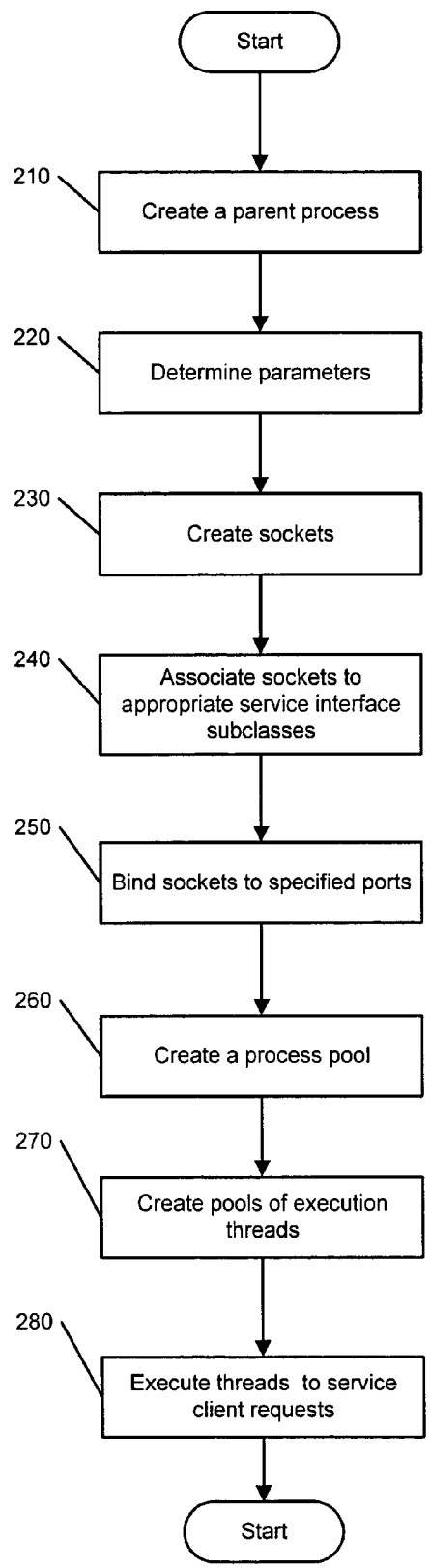
FIG. 2 illustrates a flowchart of exemplary steps performed during a process of establishing a SCC architecture in a server according to an embodiment of the present invention.

FIG. 2 illustrates a flowchart of exemplary steps performed during a process of establishing a SCC architecture in a server according to an embodiment of the present invention. For purposes of illustration, in the present example, various steps are described in particular order; however, when supported by accompanying hardware and software, these steps can be performed in any order, serially or in parallel.

Initially, a parent process is created on a server (220). The parent process is the base root process in a process tree structure of the SCC architecture. The parent process then reads a configuration file to determine various parameters of the SCC architecture as described herein (220). The parent process creates sockets for various services provided by the server (230). The parent process then associates each socket to appropriate service interface subclass defined by an abstract base class in the configuration file (240). The parent process binds each socket to specified ports (250). Typically, the services provided by the server, are identified by the associated ports. The port identification is advertised to the clients coupled to the server; and the clients forward service requests to the server using appropriate ports. The parent process creates a pool of child processes (260). The numbers of child processes in the pool are determined from the configuration file. Each child process then creates a pool of execution threads (270). The child processes then execute the threads to service the client requests (280). Upon execution, each thread enters into an infinite loop to receive and service client requests.

It would be apparent to one skilled in the art that the invention can be embodied in various ways and implemented in many variations. Such variations are not to be regarded as a departure from the spirit and scope of the invention. In particular, the process steps of the method according to the invention include methods having substantially the same process steps as the method of the invention to achieve substantially the same results. Substitutions and modifications have been suggested in the foregoing detailed description and others will occur to one of ordinary skill in the art. All such modifications as would be clear to one skilled in the art are intended to be included within the scope of the following claims and their equivalents.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically, and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings, or elsewhere in this document, to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A method of servicing a client request in a server comprising:
    creating a parent process on the server, wherein the parent process reads a configuration file, the configuration file containing service definitions, a service load indicator, and socket data;
    creating a child process on the server;
    creating a plurality of worker threads within the child process, wherein one of the plurality of worker threads operates in an infinite loop and enters a cross-process section that enables only one worker thread in the child process to call a socket select function;
    the one worker thread calling an accept function of a request socket to obtain a client connection;
    determining a first service interface subclass corresponding to the client request from one or more service interface subclasses derived from a request interface base abstract class wherein the first service interface subclass is defined for a socket; and
    servicing the client request using the first service interface subclass, wherein the first service interface subclass corresponds to at least one service provided by the server at a corresponding port wherein the at least one service provided by the server is identified by the corresponding port.

2. A method according to claim 1, wherein the one or more service interface subclasses comprise at least one protocol handler for servicing the client request at the corresponding port.

3. A method according to claim 1, wherein the first service interface subclass is determined from the configuration file.

4. A method according to claim 3, wherein the configuration file comprises descriptions of
    the services provided by the server; and
    the corresponding port for the at least one service.

5. A method according to claim 1, wherein one of the one or more service interface subclasses is configured to service Post Office Protocol requests at the corresponding port.

6. A method according to claim 1, wherein one of the one or more service interface subclasses is configured to service Simple Mail Transfer Protocol requests at the corresponding port.

7. A method according to claim 1, wherein determining a first service interface subclass and servicing the client request are performed by the parent process.

8. A method according to claim 7, wherein the child process is configured to service the client request.

9. A method according to claim 8, further comprising: adjusting a number of child processes according to a load of the server.

10. A method according to claim 1, wherein the at least one service includes a scanning service.

* * * * *